Nov. 24, 1970 F. R. MOTTOLA 3,541,703
APPARATUS FOR TRAINING A STUDENT-PASSENGER IN A VEHICLE
OPERATED BY A STUDENT-DRIVER
Filed April 15, 1968 3 Sheets-Sheet 1

*INVENTOR.*
FREDERICK R. MOTTOLA
BY
McCormick, Paulding & Huber
ATTORNEYS

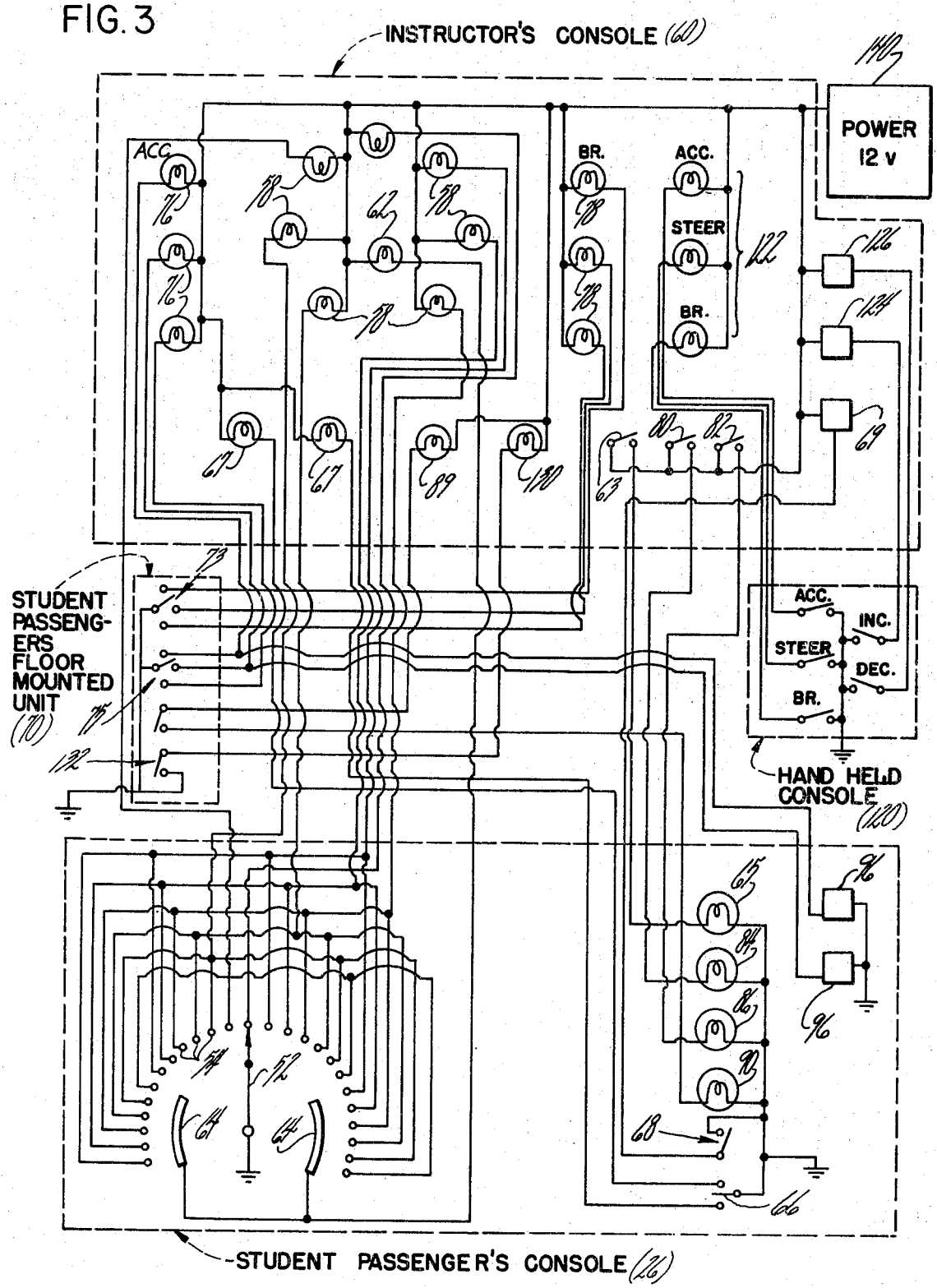

United States Patent Office 3,541,703
Patented Nov. 24, 1970

3,541,703
APPARATUS FOR TRAINING A STUDENT-PASSENGER IN A VEHICLE OPERATED BY A STUDENT-DRIVER
Frederick R. Mottola, 152 Peters Circle, Southington, Conn. 06489
Filed Apr. 15, 1968, Ser. No. 721,450
Int. Cl. G09b 9/04
U.S. Cl. 35—11                              9 Claims

ABSTRACT OF THE DISCLOSURE

A student-passenger console mounted on the rear of the front seat of the vehicle has inactive controls, including a steering wheel with artificial feel for use by a student-passenger in the rear seat. A floor mounted unit below this console has at least a brake and an accelerator pedal, and all of these student-passenger controls do not actively effect the operation of the motor vehicle, but instead light indicator lamps on an instructor's console from which an instructor can determine the student-passenger's response to the actual driving situation in which the student-driver is operating. Lamps on the student-passenger's console can be selectively illuminated by the instructor to silently suggest corrections to the student-passenger's response without distracting a student-driver in actual control of the vehicle. A second student-passenger can operate a hand held console to permit him to contribute his responses to the actual driving situation.

SUMMARY OF INVENTION

This invention relates generally to driver training devices, and deals more particularly with an apparatus for use in a conventional motor vehicle to train a student-passenger while the vehicle is operated by a student-driver.

A general object of the present invention is to provide an apparatus of the foregoing character which permits a student-passenger to gain some experience during the actual training of another student in control of the vehicle.

Another general object is to provide an inactive steering wheel not connected to the actual steering mechanism of the vehicle, but connected electrically to a console in front of the instructor so that the latter can evaluate the steering abilities of a student-passenger in the rear, or back seat.

Another general object is to provide inactive brake and accelerator controls for the student-passenger, which are electrically connected to the instructor's console for evaluation by him by the student-passenger's speed controlling abilities in a particular driving situation encountered by the student-driver.

Another object of the present invention is to provide an apparatus of the foregoing character which permits the instructor to silently inform the student-passenger of his progress without distracting the student-driver in control of the vehicle.

Another object of the present invention is to provide an apparatus of the foregoing character to enable the instructor to make use of his student-passenger's back-seat time, and to thereby reduce the overall cost of driver training per unit vehicle, and also per unit instructor.

Another object of the present invention is to provide an apparatus of the foregoing character to make optimum use of actual driving situations by locating the apparatus in a conventional motor vehicle, thereby avoiding inherent environmental limitations to stationary training aids heretofore available.

Another object of the present invention is to provide an apparatus of the foregoing character which permits a student-passenger to contribute his thoughts and responses to an actual driving situation encountered by a student-driver without distracting the student-driver who is actually controlling the vehicle.

Another object of the present invention is to provide an apparatus of the foregoing character which permits an instructor to evaluate a student-passenger prior to the time when such student is given actual control of the vehicle.

BRIEF DESCRIPTION OF THE DRAWINGS

FIG. 3 is a schematic electrical view of the circuitry associated with the apparatus of FIG. 1.

DETAILED DESCRIPTION

Figure 1:
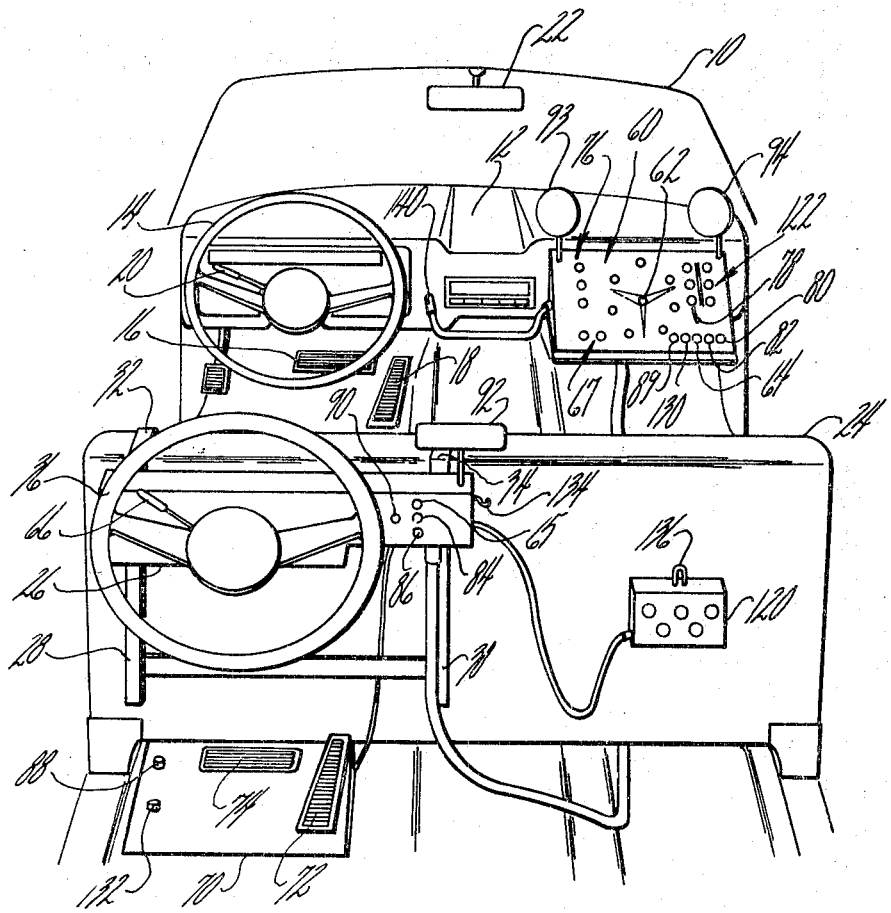
FIG. 1 is a perspective view of the interior of a conventional motor vehicle fitted with apparatus of the present invention, including a student-passenger console mounted on the back of the front seat of said vehicle.

Turning now to the drawings in greater detail, FIG. 1 shows the pertinent components of a conventional motor vehicle, looking forwardly from the rear of the vehicle. The vehicle's front wind screen is shown at 10, being mounted above the conventional dashboard 12, with all of the active controls normally associated with a conventional motor vehicle also being provided, including a steering wheel 14, conventionally located, with conventional accelerator and brake pedals 16 and 18 on the floor of the vehicle immediately below the steering wheel 14. A turn signal indicator 20 is provided as shown for operation of the vehicle's directional lights. A rear view mirror for use by the driver of the vehicle is provided at 22 in its conventional location. Thus, all of the above-mentioned controls can be used to operate a motor vehicle as represented schematically in FIG. 1. In using such a vehicle for driver training, an instructor would normally sit on the right-hand side of the front seat indicated generally at 24, while his student-driver would be seated on the left-hand side of the front seat 24 for manipulation of the active vehicular controls, such as the steering wheel 14 and the pedals 16 and 18.

Figure 2:
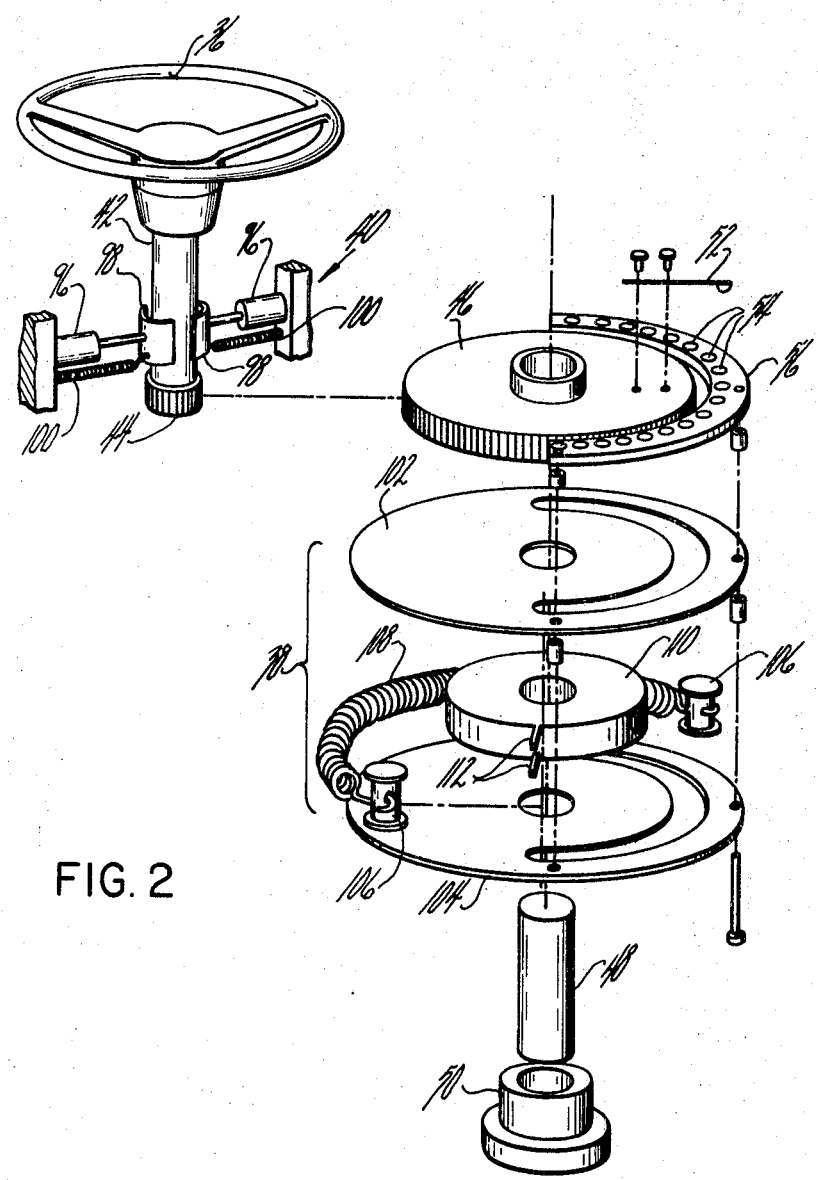
FIG. 2 is an exploded view of the inactive steering wheel which is provided on the student-passenger's console of FIG. 1.

In accordance with the present invention, and in keeping with the foregoing objects, a student-passenger's console 26 is provided on the rear or back portion of the front seat 24, immediately behind the student-driver, 'for use by the student-passenger during operation of the vehicle by the student-driver. More particularly, the student-passenger's console comprises a relatively shallow rectangular housing removably secured to the back of the front seat 24 by a pair of brackets 28 and 30 each of which is mounted on the rear wall of the housing 26, and includes inverted U-shaped upper end portions, indicated generally at 32 and 34 respectively, for encircling the upper edge of the back portion of the front seat 24. A steering wheel 36 is rotatably mounted in the front wall of the housing for use by the student-passenger who would occupy the rear seat (not shown) of the vehicle and it is an important feature of the present invention that the steering wheel 36 comprises no part of the conventional vehicular controls used in operating the motor vehicle. As best shown in FIG. 2 the inactive steering wheel 36 is provided with a self-centering device, indicated generally at 38, and an artificial feel mechanism, indicated generally at 40, for imparting to the steering wheel 36 the necessary characteristics for creating a realistic driving situation for the student-passensger.

Referring more particularly to FIG. 2, the steering wheel 36 is mounted on a short shaft 42, which shaft carries a small spur gear 44 at its lower end portion for engagement with a larger spur gear 46 rotatably mounted on a shaft 48, rotatably supported in the console housing 26 by suitable means 50. The spur gear 46 carries a wiper arm 52, which arm comprises part of a rotary switch having a plurality of contacts 54, 54 circumaxially arranged around a portion of the gears periphery on an arcuate bracket 56. Thus, depending upon the number of teeth associated with the gears 44 and 46, the steering wheel 36 can be rotated through several revolutions corresponding approximately to one-half a revolution of the gear 46, and hence of the wiper arm 52.

Thus, the above-described rotary switch associated with the steering wheel 36 comprises means responsive to the degree of rotation of the steering wheel, and in accordance with the present invention the rotary switch serves to electrically energize a graphical display of the degree of rotation of the wheel 36 to an instructor seated beside the student-driver in the front seat of the vehicle.

As shown in FIG. 1, the instructor is provided with a console 60 located at least partly in the glove compartment of the vehicle, having a plurality of electrically energizable lamps provided thereon in a circular pattern to provide a continuous visual display of the angular position of the wheel 36, at least through one complete revolution thereof. The display also includes an additional lamp centered in the circular pattern, as shown at 62, and means is provided in the circuit between the rotary switch discussed hereinabove and the lamp 62 for illuminating this additional lamp in response to rotation of the wheel 36 past one full revolution. As best shown in FIG. 3, said means comprises a pair of elongated arcuate contact strips 64, 64 associated with the contacts 54, 54 which strips are engaged by the wiper arm 52 whenever the steering wheel 36 has been rotated beyond one complete revolution. The contacts 54, 54 associated with the elongated contact strips 64, 64 are connected to the circular pattern of lamps indicated generally at 58 for illuminating the same to indicate to the instructor the degree of angular rotation in excess of one revolution. Thus, the instructor can conveniently monitor the student-passenger's steering ability in responding to the actual driving situation at any given instant of time while the vehicle is being operated by the student-driver actually in control of the pehicle. In order to advise the student-passenger of the merit or correctness of his responses, a pushbutton type switch 63 on the instructor's console is electrically connected to a lamp 65 on the student-passenger's console for indicating to the latter that some correction in the latter's action is required.

Still with reference to the student-passenger's console 26, the apparatus shown in FIG. 1 also shows a turn signal switch 66 which is electrically connected to a pair of electrical lamps, indicated generally at 67 on the instructor's console 60, for providing the instructor with a visual indication of his student-passenger's response to this requirement in the driving situation. The inactive steering wheel 36 is also provided with a horn button 68, which button is electrically connected to a horn buzzer 69 as shown in FIG. 3 provided in the instructor's console 60.

In further accordance with the present invention, the student-passenger station in the rear seat of the motor vehicle is also provided with a floor mounted unit 70 behind the front seat and generally below the console 26 described hereinabove. Accelerator and brake pedals, 72 and 74 respectively, are provided on the unit 70 for manipulation by the student-passenger and it is an important feature of the present invention that both pedals are provided with a multi-position switching device, indicated generally at 73 and 75 respectively in FIG. 3, for electrically energizing one of a set of three lamps, 76 and 78 respectively, on the instructor's console 60 and labeled acceleration and braking respectively. These pedal position switches, 73 and 75, in combination with the lamps, 76 and 78, provide a convenient means responsive to the degree of displacement of the brake and accelerator pedals, 72 and 74, for indicating to the instructor the student-passenger's responses in the acceleration and braking phases of the driving training situation. In line with the feedback information provided by the instructor for the student-passenger in monitoring the steering phase of his training, push-button switches 80 and 82 on the instructor's console 60 are associated with the lamps 84 and 86 respectively on fhe student-passenger's console for advising the student-passenger of the merits of his response in the acceleration and braking phases.

Still with reference to the floor unit 70 upon which the inactive accelerator and brake pedals 72 and 74 are provided, an inactive headlight dimmer switch 88 is provided thereon for illuminating a lamp 89 on the instructor's console to indicate the student-passenger's response to the night driving situation. A conventional high beam indicator lamp 90 is provided on the student-passenger's console 60. A left foot position indicator switch 132 on the unit 70 indicates to the instructor, by the lamp 130, that the student-passenger is not driving with his left foot on the brake pedal 74 while his right foot operates the accelerator pedal 72. Finally, the student-passenger is provided with a rearview mirror 92, and the instructor preferably has a mirror 93 for monitoring the face of the student-passenger to ascertain whether his eye movements are proper. For the same reason, the instructor is provided with a mirror 94 for monitoring the face of his actual student-driver to ascertain whether the latter is utilizing his rearview mirror 22.

As mentioned hereinabove, the student-passenger's steering wheel 36 is provided with artificial "feel" and with a self-centering device in order to better simulate the operation of an actual steering wheel during an actual driving situation. As best shown in FIG. 3, a pair of solenoids 96, 96 located in the student-passenger's console 26 are electrically energized when the inactive accelerator pedal 72 is depressed beyond its intermediate position, as shown at 75. These solenoids 96, 96, also shown in FIG. 2, activate pressure plates 98, 98 which move away from the shaft 42 upon which the steering wheel 36 is mounted to remove friction between the plates and the shaft during rotation of the wheel when the student-passenger has depressed the accelerator pedal 72. Spring biasing means, indicated generally at 100, is provided for applying these pressure plates 98, 98 when the solenoid 96, 96 are not so energized. The self-centering device 38 is also shown in FIG. 2 and comprises a pair of fixed plates 102, and 104 provided in axially spaced relation on the shaft 48 for receiving the posts 106, 106 provided for this purpose on the ends of a spring 108. A spacer 110 mounted in fixed relation to the shaft 48 has radially outwardly extending lugs 112, 112 for engaging the posts 106, 106 whenever the steering wheel 36 is rotated so that the spring 108 provides a return force exerted upon the shaft 48 to return the steering wheel 36 to its neutral, or straight-ahead position. While any convenient source of vehicle electrical power might be used for the apparatus described herein, the various components preferably are operated from a power source 140 which preferably comprises the vehicle's cigarette lighter socket.

In accordance with one of the fundamental objects of the present invention, namely to best utilize a student-passenger's "back seat" time, means is provided for monitoring certain responses of still another student-passenger seated beside the student-passenger described hereinabove. More particularly, FIG. 1 shows a hand-held console 120 having five push-button type switches provided thereon and labeled "acceleration," "steering," "brakes," and "increase," "decrease," respectively. These push-button type switches permit the additional student to illuminate one or more of the lamps, indicated generally at 122, on the instructor's console 60. These lamps 122 are labeled "acceleration," "steering" and "brakes" as shown in FIG. 3 to indicate to the instructor that the additional student feels that one or more of the student-driver's actions merit correction. The lower two push buttons on the additional student's trainer console 120 labeled increase and decrease respectively are electrically connected to buzzers 124 and 126 of high and low frequency tone provided in the instructor's console for indicating to the instructor that more or less acceleration, steering, or braking action should be taken by the student-driver. For example, if the acceleration lamp is lit and the high frequency buzzer sounds it would be apparent to the instructor that his additional back seat student-passenger felt that the student-driver was accelerating too fast. A hook 134 is provided on the end of the student-passenger's console 26 for receiving an eye 136 on the hand-held console 120 for storage of the latter.

The invention claimed is:
1. In a conventional motor vehicle having front and rear seats and having active controls accessible from the front seat for operating the vehicle from the student-driver's side of the front seat, said controls including an active steering wheel and active brake and accelerator pedals, the improvement comprising a student-passenger's console, an inactive steering wheel mounted on said console, means for mounting said console on the back portion of said front seat so that said inactive steering wheel can be manipulated by a student-passenger sitting in the rear seat of the motor vehicle, means responsive to the degree of rotation of said inactive steering wheel, an instructor's console, and a plurality of electrical lamps arranged in a generally circular pattern on said instructor's console, said lamps being in circuit with said means responsive to the degree of rotation of said inactive steering wheel to provide a continuous visual display of the angular position of said inactive wheel.

2. The combination defined in claim 1 and further characterized by a floor mounted unit for use behind the front seat below said student-passenger's console, inactive brake and accelerator pedals mounted on said unit, means responsive to the degree of displacement of said inactive brake and accelerator pedals, and indicating lamp means on said instructor's console for displaying graphically the degree of displacement of said inactive pedals to provide a continuous display of the position of said inactive pedals adjacent said steering wheel display.

3. The combination defined in claim 2 further characterized by means for returning the inactive steering wheel to a normal centered position when released in a rotated position by a student driver occupying the rear seat of the vehicle, and means for releasing said inactive wheel for free rotation when said accelerator pedal is displaced by a predetermined amount.

4. The combination defined in claim 3 wherein said instructor's console for displaying the degree of rotation of said inactive steering wheel and for displaying the displacement of said brake and accelerator pedals is located at least partly in the glove compartment recess of the conventional motor vehicle's dashboard, said instructor's console having a power cord adapted to receive electrical energy for the lamps thereon from the vehicle's electrical system.

5. The combination defined in claim 4 and further characterized by a turn signal switch device associated with said inactive steering wheel, and indicator lamps on said instructor's console and operable in response to said turn signal switch for indicating to an instructor in the front seat of the vehicle the position of said turn signal device.

6. The combination defined in claim 5 and further characterized by three electrical switches on said instructor's console, and three lamps on said student-passenger's console labeled respectively acceleration, steering and brakes, each of said lamps being in circuit with one of said three switches for use by the instructor to indicate to the student-passenger in the rear seat of the vehicle that one or more of the latter's actions merit correction.

7. The combination defined in claim 6 and further characterized by a hand held trainer console for use by an additional student seated beside the student-passenger in the rear seat of the vehicle, said last-mentioned console having three electric switches thereon, and three lamps on said instructor's console labeled respectively acceleration, steering and brakes, each of said lamps being in circuit with one of said three switches on said hand held traner console for use by said additional student to indicate to the instructor that one or more of the student-driver's actions merit correction.

8. The combination defined in claim 7 and further characterized by an increase and a decrease switch on said hand-held console, and means in said instructor's console responsive to the closing of said increase and decrease switches respectively for indicating to the instructor that more or less acceleration, steering, and braking action should be taken by the student-driver depending upon which of the acceleration, steering and brake lamps is lit at the time when said means is so energized by closing of one said last-mentioned switches.

9. The combination defined in claim 1 wherein said inactive steering wheel is capable of rotation in either direction through an angular displacement of more than one full revolution, and wherein said indicating means for displaying the degree of rotation of said inactive wheel includes an additional lamp centered in said circular pattern, and means in said circuit means for illuminating said additional lamp in response to rotation of said inactive wheel past said one full revolution, said circular pattern of lamps also serving to indicate to the instructor the degree of angular rotation in excess of one revolution.

References Cited

UNITED STATES PATENTS

| | | | |
|---|---|---|---|
| 2,700,227 | 1/1955 | Arkell et al. | 35—11 |
| 2,994,153 | 8/1961 | Zwolinski. | |
| 3,309,794 | 3/1967 | Greenshields | 35—11 |

WILLIAM H. GRIEB, Primary Examiner